United States Patent
Mork et al.

(10) Patent No.: US 7,261,117 B2
(45) Date of Patent: Aug. 28, 2007

(54) DIVERTER VALVE ASSEMBLY

(75) Inventors: Steve O. Mork, Lowell, MI (US);
Michael J. Kosak, Byron Center, MI (US); Bradley J. Pippel, Grandville, MI (US)

(73) Assignee: Access Business Group International LLC, Ada, MI (US)

( * ) Notice: Subject to any disclaimer, the term of this patent is extended or adjusted under 35 U.S.C. 154(b) by 285 days.

(21) Appl. No.: 10/966,771

(22) Filed: Oct. 15, 2004

(65) Prior Publication Data

US 2005/0092377 A1     May 5, 2005

Related U.S. Application Data

(60) Provisional application No. 60/512,233, filed on Oct. 17, 2003.

(51) Int. Cl.
*F16K 11/06*     (2006.01)

(52) U.S. Cl. .................. 137/1; 137/597; 137/625.17; 137/625.41

(58) Field of Classification Search .......... 137/597, 137/624.17, 624.41, 119.01, 517, 625.17, 137/625.41, 1
See application file for complete search history.

(56) References Cited

U.S. PATENT DOCUMENTS

| | | | |
|---|---|---|---|
| 3,643,692 A | 2/1972 | Traylor | |
| 3,669,148 A | 6/1972 | Burkhalter, Jr. et al. | |
| 3,709,248 A * | 1/1973 | Aurich et al. | 137/271 |
| 3,779,281 A | 12/1973 | Brane | |
| 4,242,201 A | 12/1980 | Stephens et al. | |
| 4,250,920 A | 2/1981 | Traylor | |
| 4,271,020 A | 6/1981 | Van Meter | |
| 4,313,428 A | 2/1982 | Goldenberg | |
| 4,379,053 A | 4/1983 | Brane | |
| 4,444,215 A * | 4/1984 | Zukausky | 137/98 |
| 4,522,221 A | 6/1985 | Chivens et al. | |
| 4,556,484 A | 12/1985 | Hunter et al. | |
| 4,573,493 A * | 3/1986 | Hammarstedt | 137/315.41 |
| 4,653,538 A * | 3/1987 | Tsutsui et al. | 137/625.46 |
| 4,686,037 A | 8/1987 | Lang | |
| 4,706,709 A * | 11/1987 | Monch | 137/597 |
| 4,794,952 A * | 1/1989 | Burkard | 137/597 |
| 4,808,302 A | 2/1989 | Beall, Jr. | |
| 4,972,877 A | 11/1990 | Halemba et al. | |
| 5,022,429 A | 6/1991 | Rollini et al. | |
| 5,078,176 A | 1/1992 | Woodruff | |
| 5,107,896 A | 4/1992 | Otto | |
| 5,133,385 A | 7/1992 | Kawakami | |
| 5,151,179 A | 9/1992 | Bach et al. | |
| 5,152,321 A | 10/1992 | Drager et al. | |
| 5,192,427 A | 3/1993 | Eger et al. | |
| 5,203,081 A | 4/1993 | Dahlen et al. | |

(Continued)

FOREIGN PATENT DOCUMENTS

WO    WO 02/37000    5/2002

*Primary Examiner*—Stephen M. Hepperle

(57) ABSTRACT

According to one embodiment of the present invention, a diverter valve is comprised of a valve body with multiple inlet and outlet ports. The diverter valve is further comprised of two ceramic valve sections that can be rotated with respect to each other to allow the user to direct fluid entering the valve body to one of several outlet ports. According to a second embodiment, the diverter valve of the present invention further incorporates one or more of a flow regulator, a flow meter, and a check valve.

24 Claims, 9 Drawing Sheets

U.S. PATENT DOCUMENTS

| | | |
|---|---|---|
| 5,244,013 A | 9/1993 | Gagas |
| 5,273,070 A | 12/1993 | Chili et al. |
| 5,279,329 A | 1/1994 | Pippel |
| 5,452,744 A | 9/1995 | Otto |
| 5,490,932 A | 2/1996 | Hansen et al. |
| 5,653,868 A | 8/1997 | Yanou et al. |
| 5,741,005 A | 4/1998 | Vaughan et al. |
| 5,806,552 A * | 9/1998 | Martin, Jr. ............. 137/625.41 |
| 5,823,229 A | 10/1998 | Bertrand et al. |
| 5,833,849 A | 11/1998 | Primdahl |
| 5,876,610 A | 3/1999 | Clack et al. |
| 5,884,652 A * | 3/1999 | Yeh et al. ................... 137/597 |
| 5,931,196 A | 8/1999 | Bernardi et al. |
| 5,935,426 A | 8/1999 | Giordano et al. |
| 5,937,903 A | 8/1999 | Afshar et al. |
| 6,058,971 A | 5/2000 | Palmer et al. |
| 6,155,296 A | 12/2000 | Roman |
| 6,227,246 B1 | 5/2001 | Hall et al. |
| 6,241,103 B1 | 6/2001 | Hembree |
| 6,258,266 B1 | 7/2001 | Riback et al. |
| 6,293,298 B1 | 9/2001 | Brane et al. |
| 6,347,644 B1 | 2/2002 | Channell |
| 6,357,477 B1 | 3/2002 | Walcott et al. |
| 6,372,132 B1 | 4/2002 | Williams |
| 6,457,589 B1 | 10/2002 | Poirier et al. |
| 6,457,698 B2 | 10/2002 | Wichmann |
| 6,517,707 B2 | 2/2003 | Giordano et al. |
| 6,539,967 B2 | 4/2003 | Tarr |
| 2001/0052367 A1 | 12/2001 | Wichmann |
| 2003/0047221 A1 | 3/2003 | Wichmann |

* cited by examiner

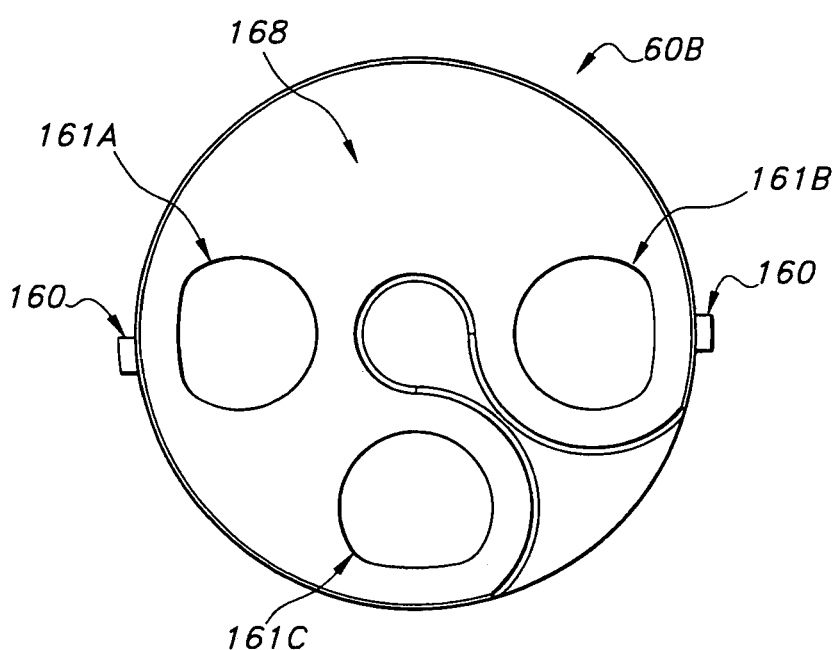
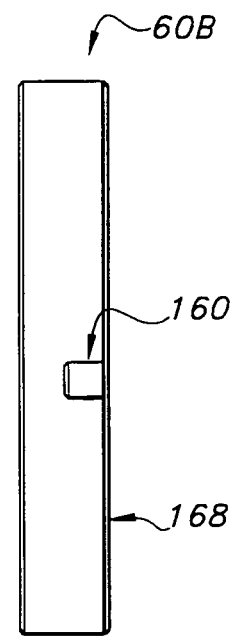
FIG. 4A  FIG. 4B
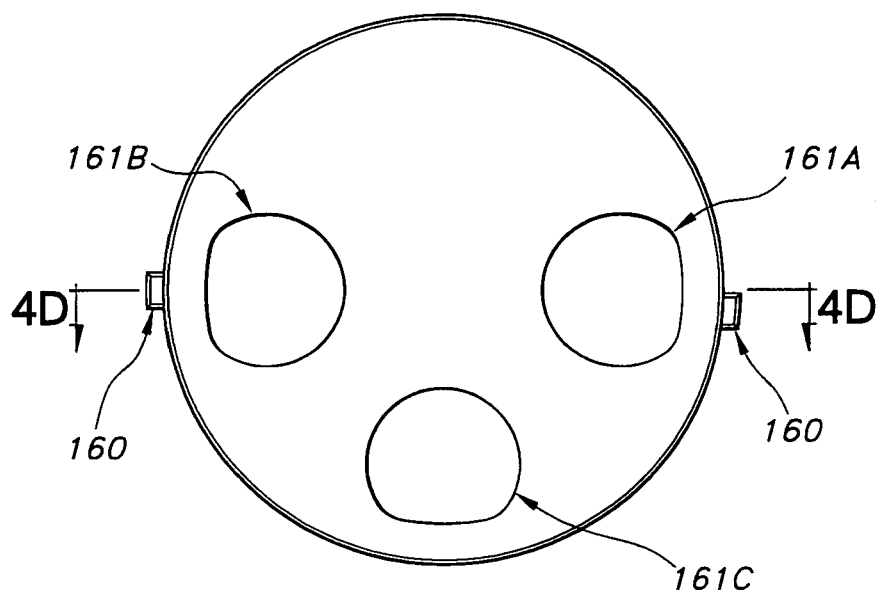
FIG. 4C
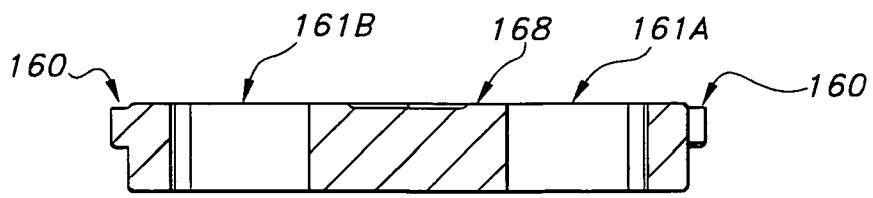
FIG. 4D

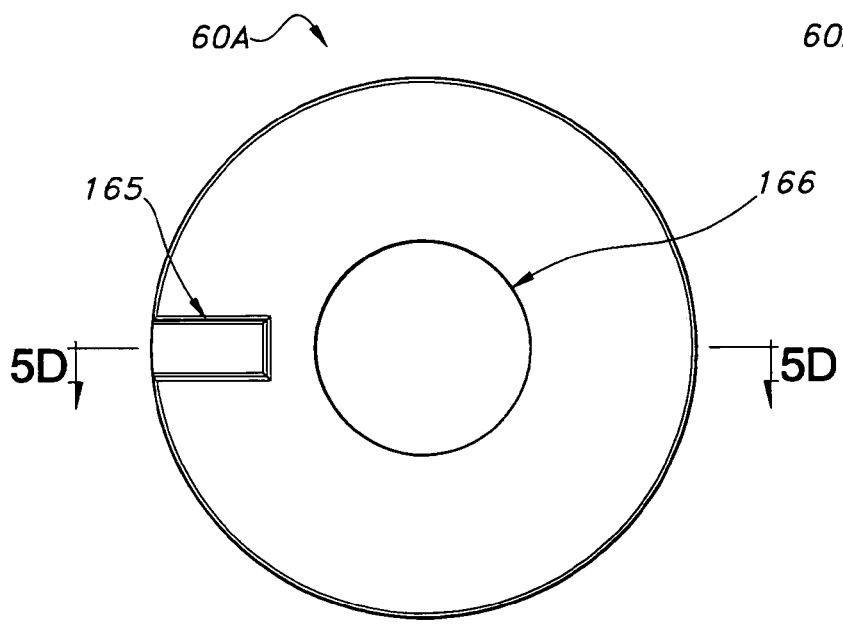
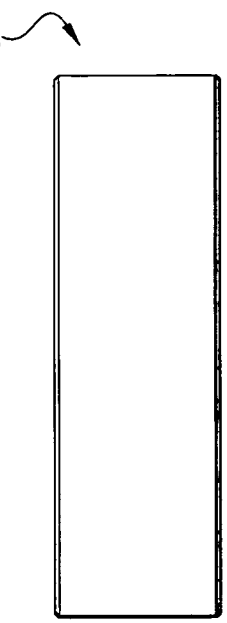
FIG. 5A    FIG. 5B
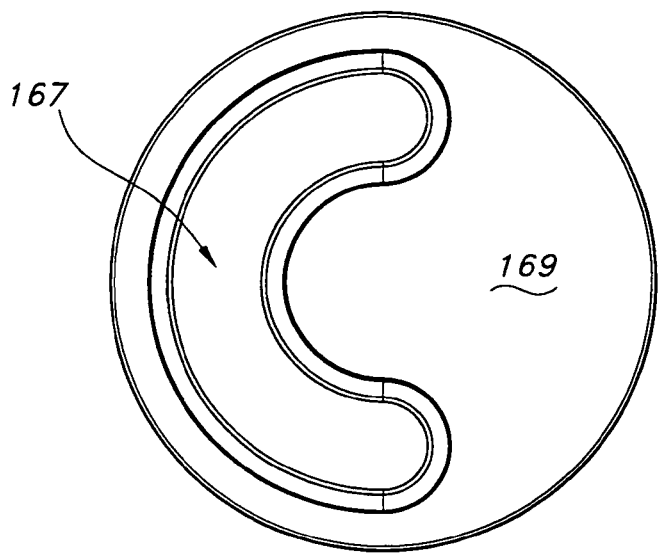
FIG. 5C
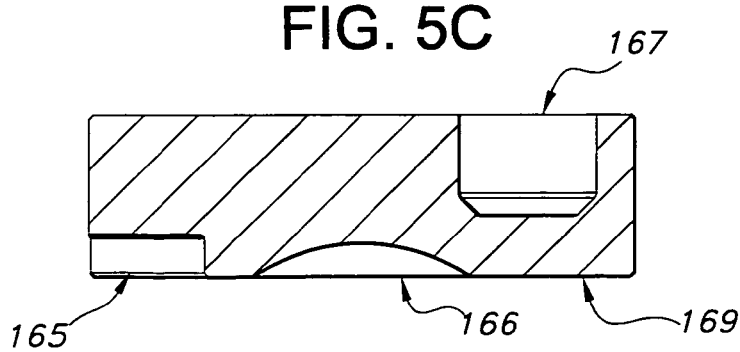
FIG. 5D

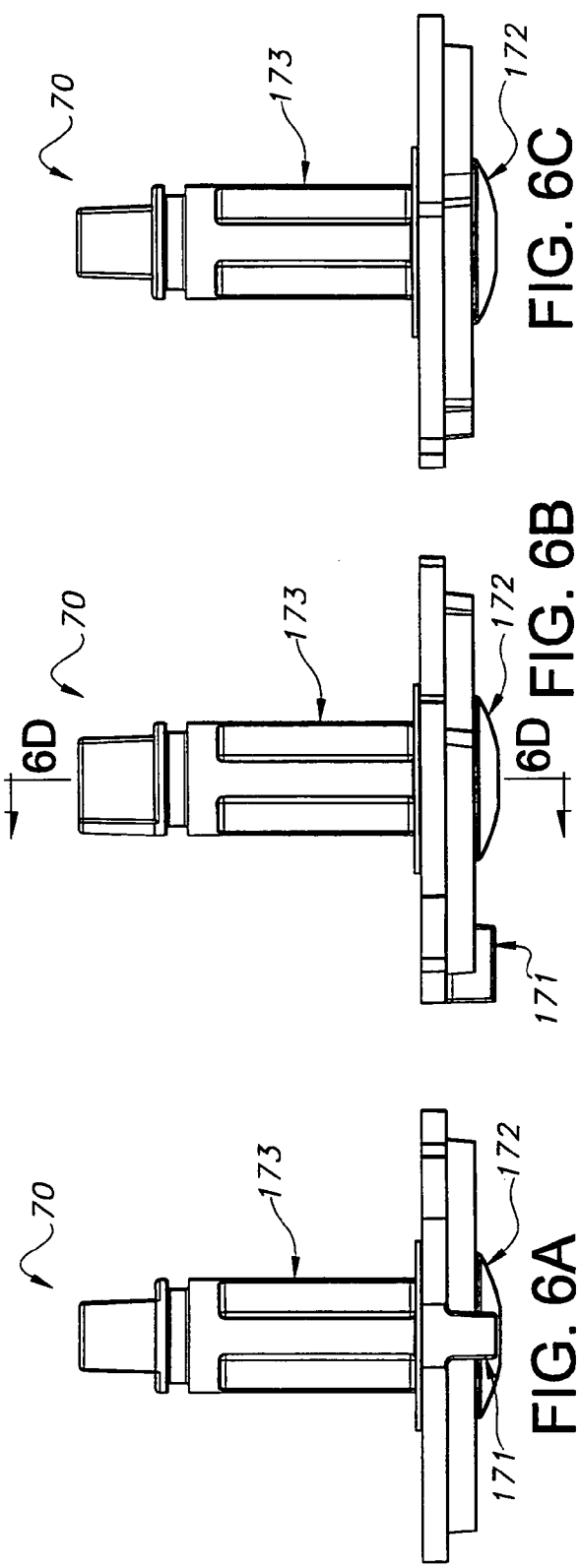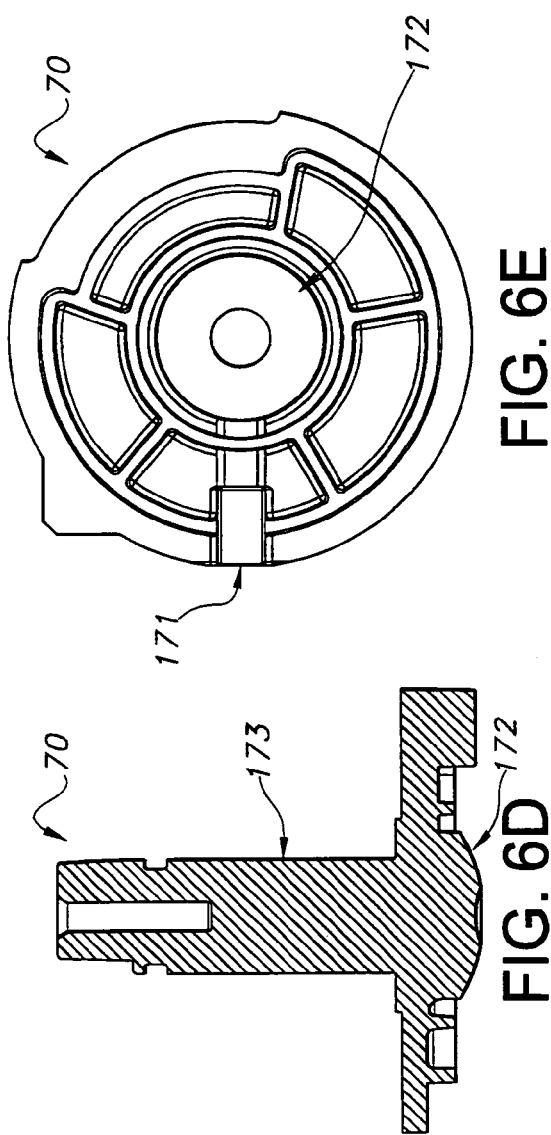

DIVERTER VALVE ASSEMBLY

RELATED APPLICATIONS

This application claims priority to and benefit of a prior U.S. Provisional Application No. 60/512,233, Diverter Valve Assembly, by Steve O. Mork et al., filed Oct. 17, 2003. The full disclosure of the prior application is incorporated herein by reference.

TECHNICAL FIELD

This invention relates generally to fluid valves, and according to one embodiment, to a diverter valve assembly that incorporates ceramic valve components, a check valve, a flow meter, and a flow regulator.

BACKGROUND OF THE INVENTION

Diverter valves are often used as a component of a larger fluid handling or treatment system. Typically, a diverter valve can be actuated to either direct a flow of fluid through one or more pieces of equipment, or to bypass that equipment. Many diverter valves currently available offer several distinct disadvantages. These valves are often constructed with materials that degrade over time or with exposure to the fluids being controlled. For example, a typical diverter valve contains rubber or polymer seals that are in contact with the moving parts of the valve and are also exposed to the fluids within the valve. These seals often degrade or fail over time, requiring the removal of the valve from service and repair or replacement of the valve seals.

In addition, fluid handling or treatment systems that rely on diverter valves often require the installation of separate flow regulators, check valves, and flow meters, resulting in the inclusion of additional joints and seals in fluid handling systems, and a greater potential for leaks and failed joints. The inclusion of such components may also result in relatively high fluid pressure drops across these systems.

The present invention provides several improvements over diverter valves know in the art.

SUMMARY OF THE INVENTION

According to one embodiment, a diverter valve is comprised of a valve body with multiple inlet and outlet ports. The diverter valve is further comprised of two ceramic valve sections that can be rotated with respect to each other to allow the user to direct fluid entering the valve body to one of several outlet ports.

According to another embodiment, a diverter valve is comprised of a valve body with a plurality of inlet and outlet ports. The valve can be manipulated by the user to direct fluid entering the valve to one or more of the plurality of outlet ports. According to this embodiment, the valve body further incorporates one or more of a flow regulator, a flow meter, and a check valve.

According to a third embodiment, a diverter valve assembly is comprised of a valve body with multiple inlet and outlet ports, and incorporates one or more of a flow regulator, a flow meter, and a check valve. The diverter valve assembly of this embodiment provides relatively low fluid pressure drop for a given volume of fluid throughput.

These and other objects, advantages, and features of the invention will be readily understood and appreciated by reference to the detailed description of the invention and the drawings.

BRIEF DESCRIPTION OF THE DRAWINGS

FIG. 4 shows one embodiment of a stationary disk.
FIG. 5 shows one embodiment of a movable disk.
FIG. 6 shows one embodiment of a valve stem.

DETAILED DESCRIPTION OF THE ILLUSTRATED EMBODIMENT

Figure 1:
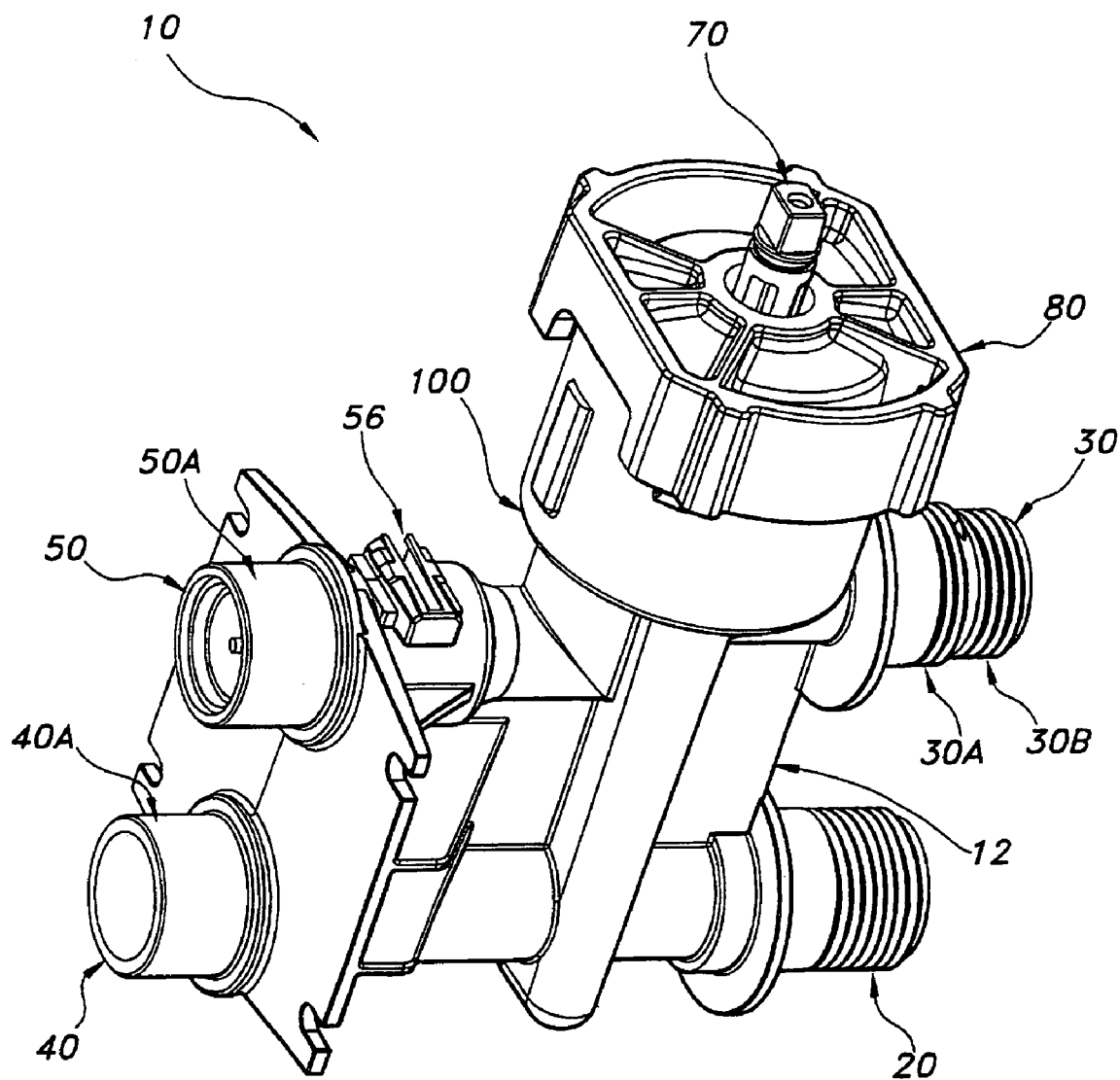
FIG. 1 is an isometric view of one embodiment of the diverter valve.

Referring to FIG. 1, the diverter valve assembly 10 of the present invention is comprised of valve body 12, valve stem 70, and retainer 80. Valve body 12 is further comprised of primary inlet 20, primary outlet 30, secondary outlet 40, secondary inlet 50, and valve housing 100. Primary inlet 20 is adapted to be coupled with a fluid source, such as a water supply line. Primary outlet 30 is adapted to be coupled with a fluid fixture, such as a faucet, shower head, tap, spout, spigot, or any other fluid fixture known in the art. Secondary outlet 40 and secondary inlet 50 are adapted to be coupled with a fluid treatment system. Herein, the phrase "coupled with" is defined to mean directly connected to or indirectly connected through one or more intermediate components. Such intermediate components may include piping, hose, tubing, fittings, couplings, or any combination thereof.

Figure 2:
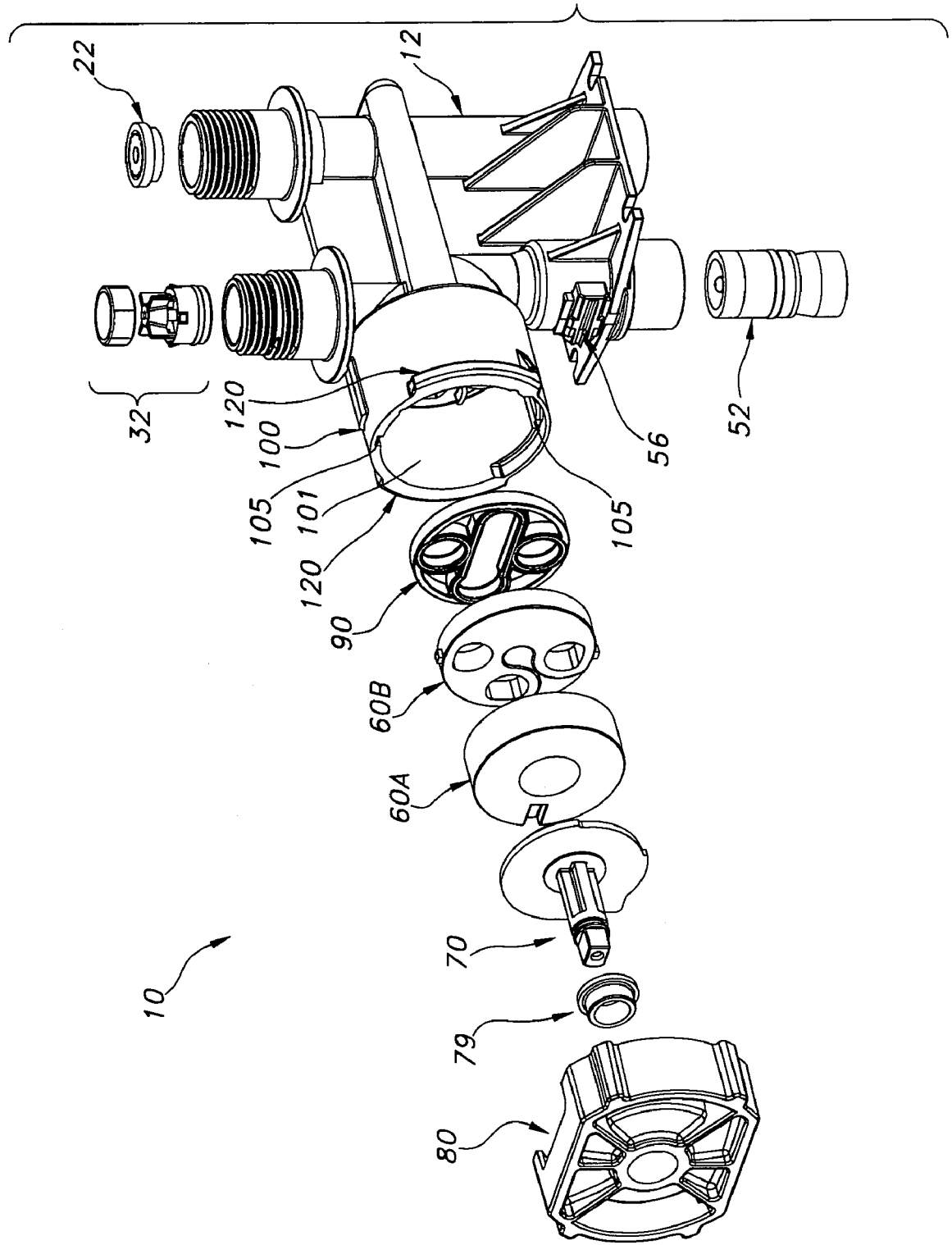
FIG. 2 is an exploded of one embodiment of the diverter valve.
Figure 3:
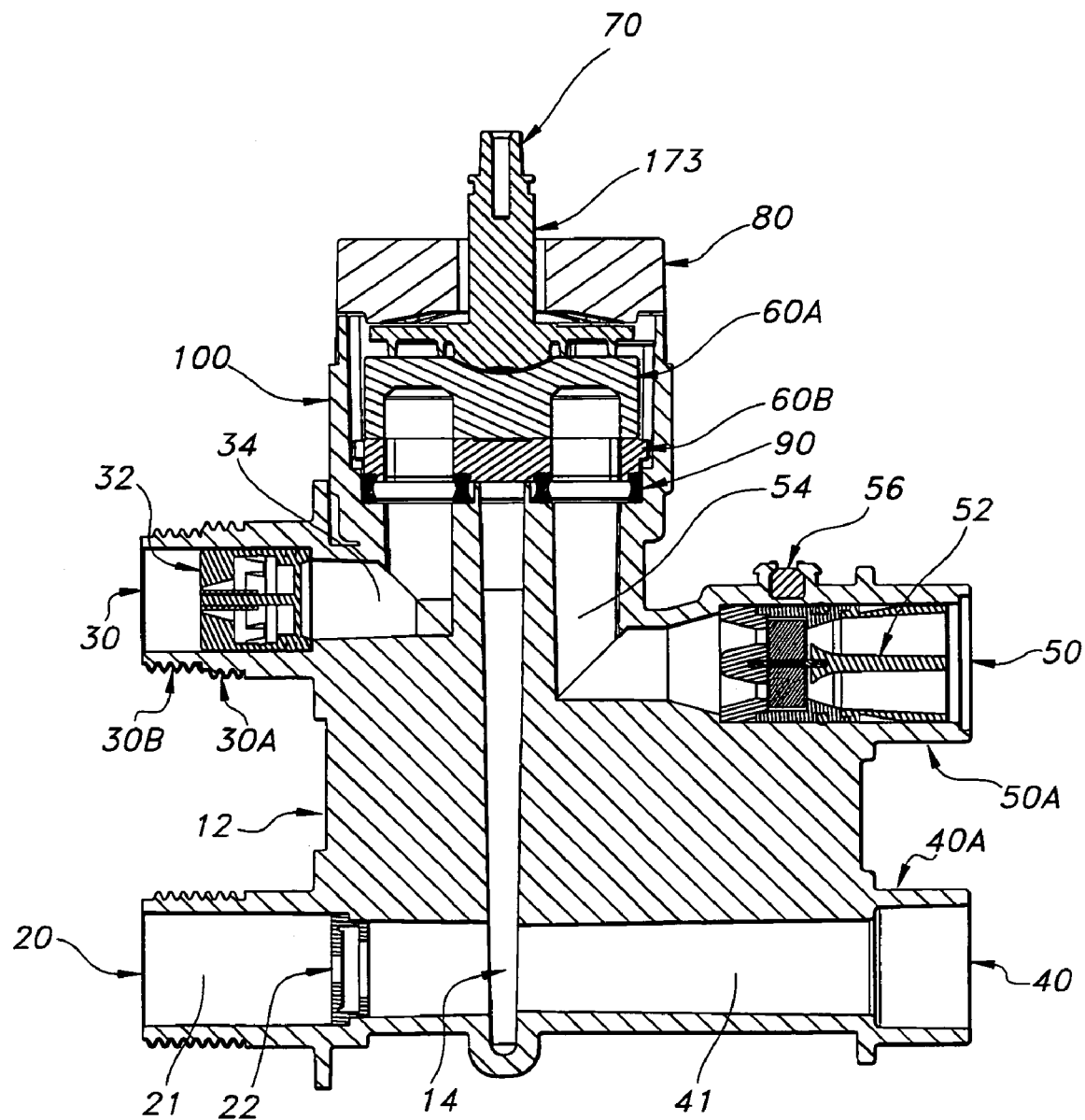
FIG. 3 is a sectional view of one embodiment of the diverter valve.

Referring to the figures, and in particular to FIGS. 2 and 3, diverter valve assembly 10 is further comprised of stationary disk 60B, movable disk 60A, and seal 90, each of which is described in more detail below.

Valve body 12 is further comprised of valve chamber 101, shoulders 120, passage 14, primary inlet channel 21, primary outlet channel 34, secondary outlet channel 41, and secondary inlet channel 54. Passage 14 is in fluid communication with primary inlet 20 and secondary outlet 40 through primary inlet channel 21 and secondary outlet channel 41 respectively. Passage 14 is selectively in fluid communication with primary outlet 30 through primary outlet channel 34 as described in more detail below. Valve chamber 101 is further comprised of one or more slots 105.

Valve body 12 is typically injection molded, and is comprised of a high pressure, high temperature isoplast by Dow Chemical Company, although one skilled in the art would recognize that other manufacturing materials and processes would be equally suitable for the manufacture of valve body 12.

Exterior surface 40A of secondary outlet 40, and exterior surface 50A of secondary inlet 50 of the illustrated embodiment are manufactured without flash, ridges, "party lines", or other artifacts caused by a seam between mold pieces of valve body 12. This is accomplished by inserting a pipe or other tubular device (not shown) into the mold recesses corresponding to the exterior surfaces 40A and 50A of apertures 40 and 50 either before, during, or after the injection of isoplast into valve body 12 mold (not shown). The pipe or other tubular device is not attached or fixed to exterior surfaces 40A and 50A.

Optionally disposed entirely within primary inlet channel 21 is flow regulator 22. Flow regulator 22 regulates the flow of fluid through diverter valve assembly 10 as described in more detail below. Optionally disposed entirely within secondary inlet channel 54 is flow meter 52. Mounted on valve body 12 proximate to flow meter 52, is flow meter sensor 56. Flow meter 52 and flow meter sensor 56 are operative to monitor flow of fluid through diverter valve assembly 10 as described in more detail below. It would be obvious to those skilled in the arts that flow meter 52 could also be alternatively disposed within one or more of primary inlet channel 21, primary outlet channel 34, or secondary outlet channel 41, with flow meter sensor 56 located proximate to flow meter 52. Optionally disposed entirely within primary outlet channel 34 is check valve 32. Check valve 32 is operative to prevent the reverse flow of fluid through diverter valve assembly 10, as described below in more detail.

The exterior of primary outlet 30 is optionally comprised of a threaded section 30A and threaded section 30B. According to the present embodiment, threaded section 30B has a smaller outside diameter than threaded section 30A. The two distinct threaded sections allow diverter valve assembly 10 to be removably attached to a housing or surface (not shown) by inserting threaded section 30A through an aperture in the housing or surface (not shown) and threading a nut (not shown) on threaded section 30A. A threaded hose or pipe connection (not shown) can then be threaded on section 30B.

FIGS. 4A, 4B, 4C and 4D provide respectively a top, side, bottom, and sectional view of stationary disk 60B. According to the illustrated embodiment, stationary disk 60B is comprised of a 96% alumina ceramic, such as Hilox 965 by Ceramtec AG, although one skilled in the art would recognize that other materials would be equally for stationary disk 60B. Stationary disk 60B is further of comprised of a plurality of tabs 160, circular apertures 161A-C, and top surface 168.

FIGS. 5A, 5B, 5C, and 5D provide respectively a top, side, bottom, and sectional view of movable disk 60A. According to the illustrated embodiment, movable disk 60A is comprised of a 96% alumina ceramic, such as Hilox 965 by Ceramtec AG, although one skilled in the art would recognize that other materials would be equally for movable disk 60A. Movable disk 60A is further comprised of slot 165, circular recess 166, "C"-shaped recess 167 and bottom surface 169.

FIGS. 6A, 6B, 6C, 6D, and 6E provide respectively a front, left side, rear, sectional and bottom view of valve stem 70. Valve stem 70 is comprised of a polymer such as Acetal M90, although one skilled in the art would recognize that other materials would be equally for valve stem 70. Valve stem 70 is further comprised of tab 171, protuberance 172, and shaft 173.

Figure 7A:
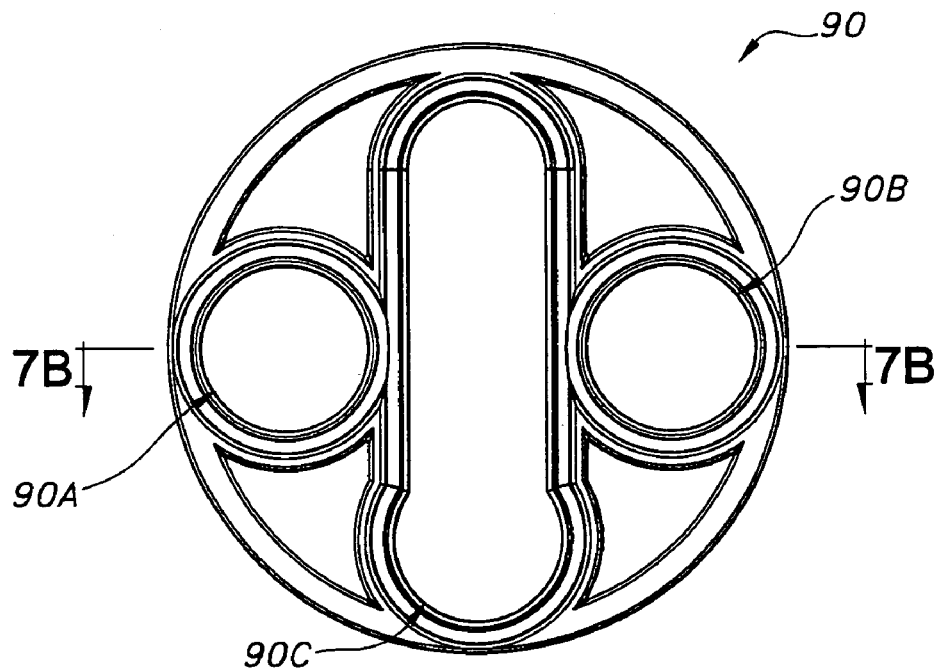
FIG. 7 shows one embodiment of a seal.
Figure 7B:
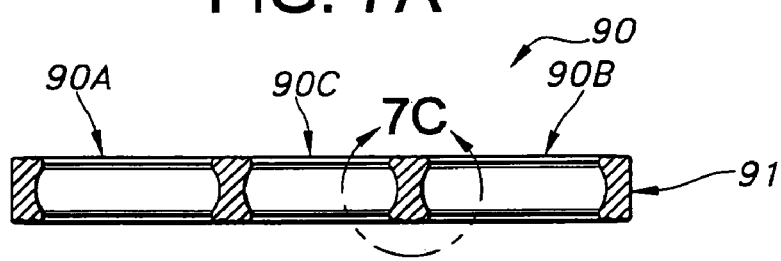
Figure 7C:
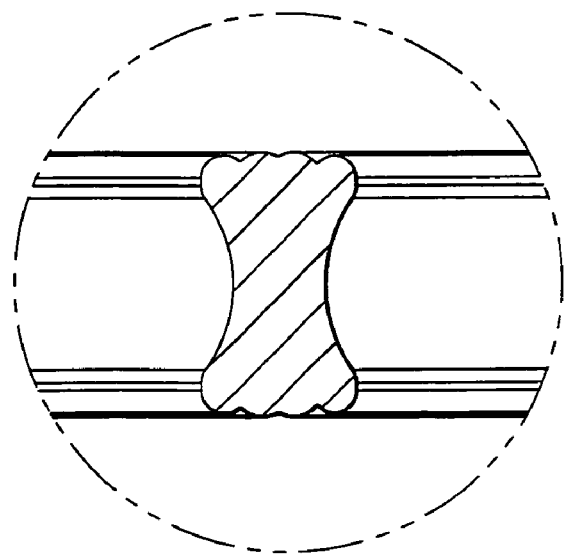

FIGS. 7A, 7B, and 7C provide respectively a top, sectional, and detail view of seal 90. According to the illustrated embodiment, seal 90 is comprised of silicone, although one skilled in the art would recognize that other materials would be equally for seal 90. Seal 90 is further comprised of outer surface 91, and circular apertures 90A and 90B, and generally oval aperture 90C. FIG. 6C provides a detail of the cross section of seal 90 between apertures 90A and 90C, and between 90B and 90C.

Figure 8A:
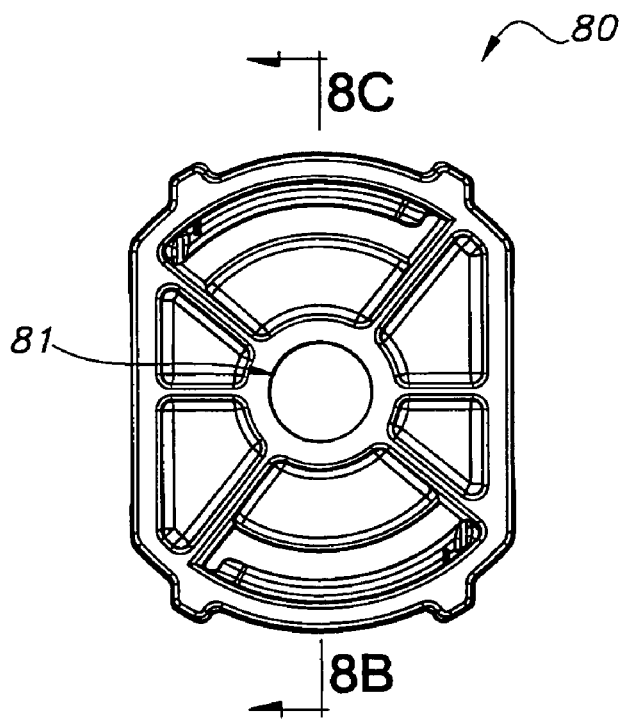
FIG. 8 shows one embodiment of a retainer.
Figure 8B:
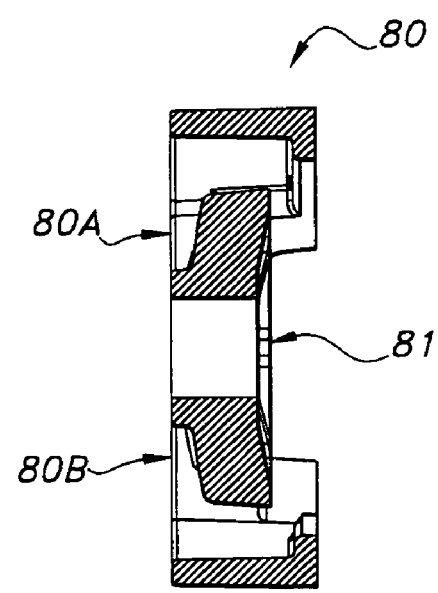
Figure 8C:
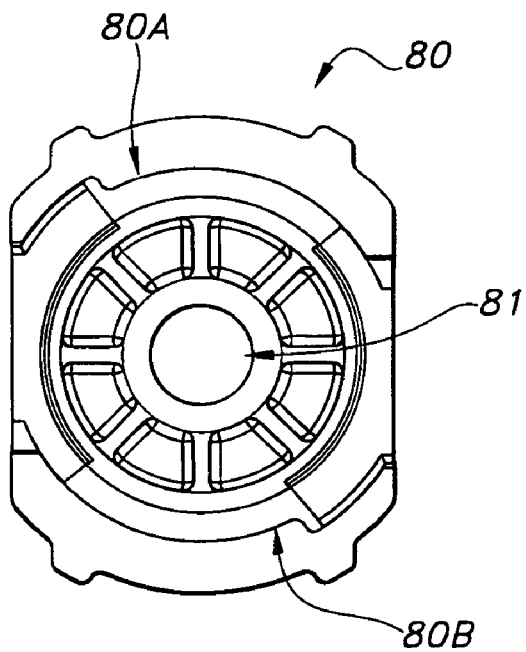

Referring to FIGS. 8A, 8B, and 8C provide respectively a top, sectional, bottom, and perspective view of retainer 80. Retainer 80 is comprised of aperture 81 and two or more tabs 80A/B that engage two or more corresponding shoulders 120 of valve housing 100, providing a quick release bayonet mounting of retainer 80 with valve housing 100.

According to the illustrated embodiment, aperture 161A of stationary disk 60B is in fluid communication with aperture 90A of seal 90, primary outlet channel 34 and primary outlet 30. Aperture 161B of stationary disk 60B is in fluid communication with aperture 90B of seal 90, secondary inlet channel 54, and secondary inlet 50. Aperture 161C of stationary disk 60B is in fluid communication with aperture 90C of seal 90, and passage 14. In addition, bottom surface 169 of movable disk 60A is in sliding contact with top surface 168 of stationary disk 60B. Outer surface 91 of seal 90 is in sealing contact with inner surface of valve chamber 101.

During operation, tab 171 of valve stem 70 engages slot 165 of movable disk 60A. In addition, protuberance 172 of valve stem 70 engages recess 166 of movable disk 60A. Rotation of shaft 173 by attached valve handle (not shown) causes rotation of tab 171 about the central axis of valve stem 70, which results in a rotation of movable disk 60A with respect to stationary disk 60B. Tabs 160 of stationary disk 60B engage with corresponding slots 105 in valve housing 100, preventing stationary disk 160B from rotating with respect to valve body 12.

A description of the operation of diverter valve assembly 10 will now be provided. For illustrative purposes only, diverter valve assembly 10 will be discussed in the context of a diverter valve that directs fluid to selectively enter a fluid treatment system (not shown), or to bypass the fluid treatment system. More specifically, and with reference to the figures, the inlet to the fluid treatment system (not shown) is coupled with secondary outlet 40 of diverter valve assembly 10, and the outlet of the fluid treatment system (not shown) is coupled with secondary inlet 50 of diverter valve assembly 10. It would be obvious to those skilled in the art that the diverter valve assembly 10 of the present invention could be used to divert the flow of fluid to a wide variety of fluid handling or processing devices. It would also be obvious to those skilled in the art that the described embodiment could be easily modified to divert fluid to two or more fluid handling or processing devices.

Figure 9:
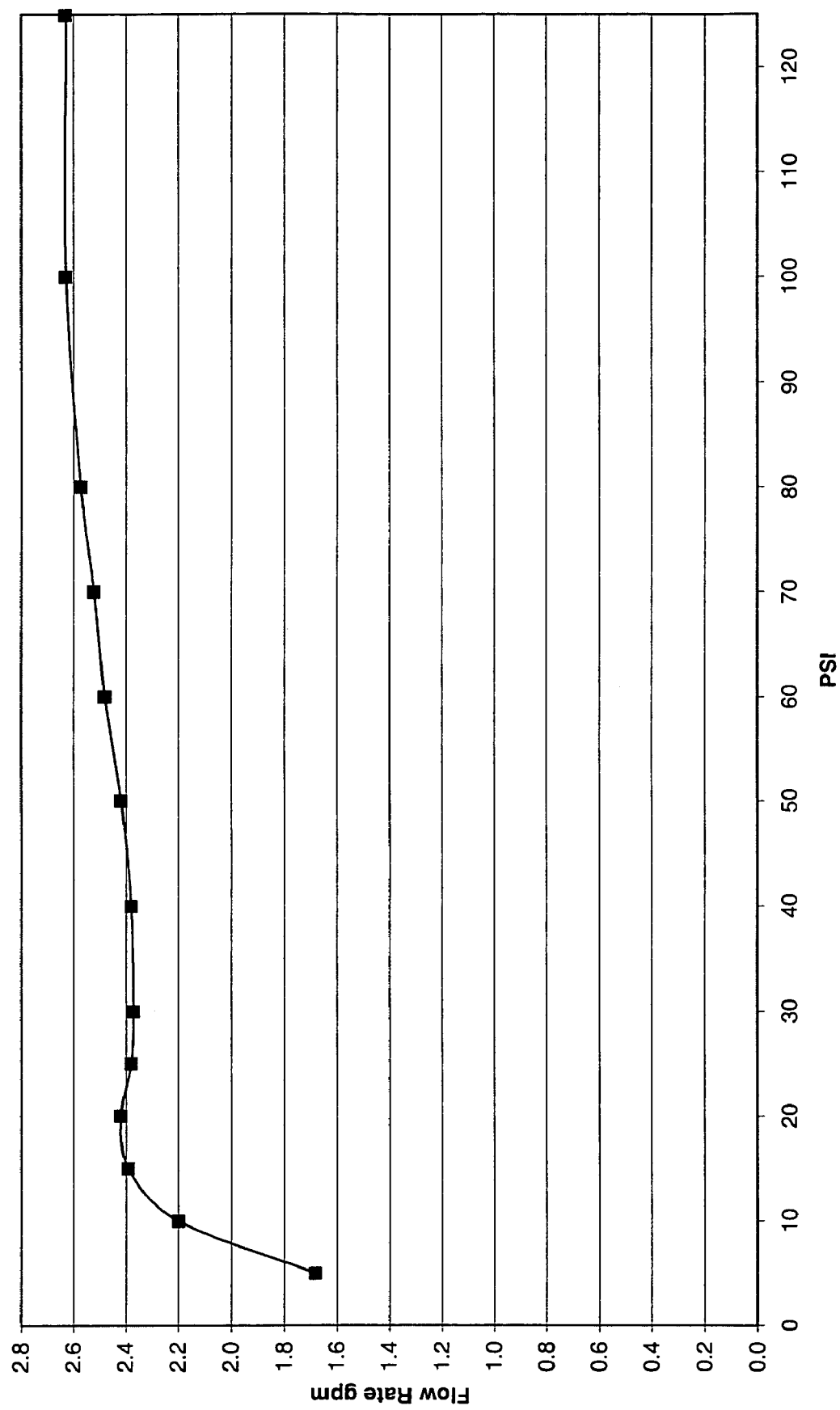
FIG. 9 shows a graph of flow rates through one embodiment of the diverter valve assembly.

During bypass mode, in which fluid entering diverter valve assembly 10 is not to be directed to a fluid treatment system, movable disk 60A is rotated by valve stem 70 with respect to stationary disk 60B to a first position, placing primary inlet 20 in fluid communication with primary outlet 30. Fluid enters diverter valve assembly 10 at inlet aperture 20, and travels through primary inlet channel 21, optional flow regulator 22, and passage 14. According to the illustrated embodiment, flow regulator 22 provides a relatively uniform flow rate of between about 1.6 and 2.65 gallons per minute (GPM) across a range of inflow pressures from about 5 to 125 pounds per square inch (PSI) as shown in FIG. 9. One flow regulator that could be used with diverter valve assembly 10 is the Neoperl Inc. E-NT 58.6273.1 flow regulator, although one skilled in the art would recognize that other flow regulators known in the art could readily be used with the present invention. Fluid then continues sequentially through aperture 90C of seal 90 and aperture 161C of stationary disk 60B, and is diverted by recess 167 of movable disk 60A through aperture 161A. Fluid then passes through aperture 90A of seal 90, primary outlet channel 34, optional check valve 32, and finally through outlet aperture 30. According to the illustrated embodiment, optional check valve 32 prevents fluid from entering diverter valve assembly 10 through aperture 30. One check valve that could be used with diverter valve assembly 10 is the Neoperl Inc. OV15 check valve; although one skilled in the art would recognize that other check valves known in the art could readily be used with the present invention.

During treatment mode, movable disk 60A is rotated with respect to stationary disk 60B by valve stem 80 to a second position, such that aperture 161A is in fluid communication with aperture 161B through recess 167. At this orientation, secondary inlet 50 is in fluid communication with primary outlet 30, and primary inlet 20 is not fluid communication with primary outlet 30 as described below. Fluid entering diverter valve assembly 10 at primary inlet 20 travels through primary inlet channel 21 and optional flow regulator 22, across passage 14, through secondary outlet channel 41 and secondary outlet 40, and enters a fluid treatment system (not shown) coupled with diverter valve assembly 10. One fluid treatment system that could be coupled with diverter valve assembly 10 is shown and described in U.S. Pat. No. 6,436,299 entitled "Water Treatment System With an Inductively Coupled Ballast" to Baarman, et al., the subject matter of which is incorporated by reference.

Treated fluid returning from the fluid treatment system (not shown) enters diverter valve assembly 10 through secondary inlet 50. Fluid then passes through secondary inlet channel 54 and optional flow meter 52. Flow meter 52 is magnetically coupled with flow meter sensor 56 to generate a signal as fluid flows through flow meter 52. This signal can be used to determine the flow volume through treated fluid aperture 50 using methods known in the arts. One embodiment of an inline flow meter magnetically coupled to a sensor that could be used with diverter valve assembly 10 is shown and described in U.S. Pat. No. 5,876,610 to Clack et al., the subject matter of which is incorporated by reference.

After passing through flow meter 52, fluid then passes through aperture 90B of seal 90, and then through aperture 161B of stationary disk 60B and is diverted by recess 167 of movable disk 60A to aperture 161A. Fluid then passes through aperture 90A of seal 90, primary outlet channel 34, optional check valve 32, and primary outlet 30.

According to one embodiment, recess 167 of movable disk 60A is adapted to provide fluid communication between apertures 161A, 161B, and 161C as movable disk 60A transitions from the first position to the second position as described above. This embodiment can help prevent a build-up of pressure within a water treatment system coupled with diverter valve assembly 10 by ensuring that the secondary inlet 50 is not isolated from primary outlet 30 until after primary inlet 20 is in fluid communication with primary outlet 30.

While in the foregoing specification this invention has been described in relation to certain preferred embodiments thereof, and many details have been set forth for the purpose of illustration, it will be apparent to those skilled in the art that the invention is susceptible to alteration and that certain other details described herein can vary considerably without departing from the basic principles of the invention.

What is claimed:

1. A diverter valve comprising:
   a valve body comprising a primary inlet, a primary outlet, a secondary inlet, and a secondary outlet;
   a flow regulator disposed at least partially within the valve body;
   a flow meter disposed at least partially within the valve body;
   a stationary disk;
   a movable disk; and
   means for selectively moving the movable disk with respect to the stationary disk into one of a first position wherein the primary inlet is in fluid communication with the primary outlet, and a second position wherein the secondary inlet is in fluid communication with the primary outlet.

2. The diverter valve of claim 1 further comprising a check valve disposed at least partially within the valve body.

3. The diverter valve of claim 1, wherein at least one of the stationary disk and the movable disk is comprised of a ceramic material.

4. The diverter valve of claim 1 further comprising a valve chamber, wherein the stationary disk and the movable disk are disposed at least partially within the valve chamber.

5. The diverter valve of claim 4 further comprising a passage in fluid communication with the valve chamber and the primary inlet.

6. The diverter valve of claim 5, wherein the passage is in fluid communication with the primary outlet when the movable disk is in the first position.

7. The diverter valve of claim 5, wherein the passage is in fluid communication with the secondary outlet.

8. The diverter valve of claim 6, wherein both the secondary inlet and the primary inlet are in fluid communication with the primary outlet as the movable disk transitions between the first position and the second position.

9. A diverter valve comprising:
   a primary inlet;
   a primary inlet channel in fluid communication with the primary inlet;
   a primary outlet;
   a primary outlet channel in fluid communication with the primary outlet;
   a secondary inlet;
   a secondary inlet channel in fluid communication with the secondary inlet;
   a secondary outlet;
   a secondary outlet channel in fluid communication with the secondary outlet;
   a passage in fluid communication with the primary inlet and the secondary outlet;
   a flow regulator;
   a check valve;
   a flow meter;
   a seal;
   a stationary disk;
   a movable disk; and
   means for selectively moving the movable disk with respect to the stationary disk into one of a first position wherein the primary inlet is in fluid communication with the primary outlet and the secondary inlet is not in fluid communication with the primary outlet, and a second position wherein the primary inlet is not in fluid communication with the primary outlet and the secondary inlet is in fluid communication with the primary outlet.

10. The diverter valve of claim 9, wherein the flow regulator is disposed at least partially within the primary inlet channel.

11. The diverter valve of claim 10, wherein the flow meter is disposed at least partially within the secondary inlet channel.

12. The diverter valve of claim 11, wherein the check valve is at least partially disposed within the primary outlet channel.

13. The diverter valve of claim 12, wherein the wherein the passage is in fluid communication with the primary outlet when the movable disk is in the first position and wherein the passage is in fluid communication only with the primary inlet and the secondary outlet when the movable disk is in the second position.

14. The diverter valve of claim 13, wherein both the secondary inlet and the primary inlet are in fluid communication with the primary outlet as the movable disk transitions between the first position and the second position.

15. A method of diverting a flow of fluid, the method comprising:
    providing a valve body that includes a primary inlet channel, a primary outlet channel, a secondary inlet channel, and a secondary outlet channel;
    supplying a flow of fluid to the primary inlet channel of the valve body;
    regulating the flow of fluid through the valve body with a flow regulator positioned within the primary inlet channel;
    selectively diverting the flow of fluid from one of the primary inlet channel to the primary outlet channel, or the secondary inlet channel to the primary outlet channel;
    monitoring the flow of fluid using a fluid monitor positioned within one of the primary inlet channel, the primary outlet channel, the secondary inlet channel, or the secondary outlet channel; and
    substantially preventing the flow of fluid from the primary outlet channel to one of the primary inlet channel, the secondary inlet channel, or the secondary outlet channel with a check valve positioned within the primary outlet channel.

16. A diverter valve comprising:
    a valve body comprising a primary inlet, a primary outlet, a secondary inlet, and a secondary outlet;
    a flow meter disposed at least partially within the valve body;
    a stationary disk;
    a movable disk; and
    means for selectively moving the movable disk with respect to the stationary disk into one of a first position wherein the primary inlet is in fluid communication with the primary outlet, and a second position wherein the secondary inlet is in fluid communication with the primary outlet.

17. The diverter valve of claim 16 further comprising a flow regulator disposed at least partially within the valve body.

18. The diverter valve of claim 16 further comprising a check valve disposed at least partially within the valve body.

19. The diverter valve of claim 16, wherein at least one of the stationary disk and the movable disk is comprised of a ceramic material.

20. The diverter valve of claim 16 further comprising a valve chamber, wherein the stationary disk and the movable disk are disposed at least partially within the valve chamber.

21. The diverter valve of claim 20 further comprising a passage in fluid communication with the valve chamber and the primary inlet.

22. The diverter valve of claim 21, wherein the passage is in fluid communication with the primary outlet when the movable disk is in the first position.

23. The diverter valve of claim 21, wherein the passage is in fluid communication with the secondary outlet.

24. The diverter valve of claim 22, wherein both the secondary inlet and the primary inlet are in fluid communication with the primary outlet as the movable disk transitions between the first position and the second position.

* * * * *